United States Patent
Platteter

(10) Patent No.: US 7,249,283 B2
(45) Date of Patent: Jul. 24, 2007

(54) DYNAMIC CONTROL SYSTEM DIAGNOSTICS FOR MODULAR ARCHITECTURES

(75) Inventor: Dale T. Platteter, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 435 days.

(21) Appl. No.: 10/806,007

(22) Filed: Mar. 22, 2004

(65) Prior Publication Data

US 2005/0210330 A1    Sep. 22, 2005

(51) Int. Cl.
    G06F 11/00    (2006.01)
(52) U.S. Cl. .................... 714/25; 714/44; 714/46; 714/57
(58) Field of Classification Search ............... 714/44, 714/46
    See application file for complete search history.

(56) References Cited

U.S. PATENT DOCUMENTS

| | | | | |
|---|---|---|---|---|
| 4,742,483 | A * | 5/1988 | Morrell .................. 358/1.13 |
| 5,200,958 | A * | 4/1993 | Hamilton et al. ............ 714/45 |
| 5,533,193 | A | 7/1996 | Roscoe |
| 5,694,528 | A * | 12/1997 | Hube ..................... 358/1.14 |
| 5,768,495 | A * | 6/1998 | Campbell et al. ............ 714/25 |
| 6,049,764 | A * | 4/2000 | Stahl ..................... 702/183 |
| 6,247,077 | B1 * | 6/2001 | Muller et al. ............... 710/74 |
| 6,335,927 | B1 * | 1/2002 | Elliott et al. ............. 370/352 |
| 6,353,899 | B1 | 3/2002 | Martin et al. |
| 6,477,572 | B1 * | 11/2002 | Elderton et al. ............ 709/224 |
| 6,584,430 | B1 | 6/2003 | Rosenbaum et al. |
| 6,615,372 | B1 * | 9/2003 | Wang ..................... 714/46 |
| 6,628,304 | B2 * | 9/2003 | Mitchell et al. ............ 715/734 |
| 6,691,249 | B1 * | 2/2004 | Barford et al. ............. 714/25 |
| 6,728,214 | B1 * | 4/2004 | Hao et al. ................. 370/241 |
| 6,782,345 | B1 | 8/2004 | Siegel et al. |
| 6,782,495 | B2 * | 8/2004 | Bernklau-Halvor .......... 714/44 |
| 7,010,718 | B2 * | 3/2006 | Ogawa et al. ................ 714/4 |
| 7,051,243 | B2 * | 5/2006 | Helgren et al. .............. 714/48 |
| 7,073,093 | B2 * | 7/2006 | Mannarsamy ............... 714/25 |
| 7,149,936 | B2 * | 12/2006 | Deshpande et al. .......... 714/57 |
| 2002/0064149 | A1 * | 5/2002 | Elliott et al. ............. 370/352 |
| 2002/0112067 | A1 * | 8/2002 | Chang et al. .............. 709/232 |
| 2002/0113816 | A1 * | 8/2002 | Mitchell et al. ............ 345/734 |
| 2003/0009253 | A1 * | 1/2003 | McIntyre et al. ........... 700/108 |
| 2003/0009553 | A1 * | 1/2003 | Benfield et al. ............ 709/224 |
| 2003/0028823 | A1 * | 2/2003 | Kallela et al. ............. 714/26 |
| 2003/0061322 | A1 * | 3/2003 | Igarashi et al. ............ 709/223 |
| 2003/0084076 | A1 * | 5/2003 | Sekiguchi et al. .......... 707/205 |
| 2003/0110413 | A1 * | 6/2003 | Bernklau-Halvor .......... 714/25 |
| 2003/0177353 | A1 * | 9/2003 | Hiltgen .................... 713/161 |
| 2004/0128669 | A1 * | 7/2004 | Furst et al. ................ 717/178 |
| 2005/0108375 | A1 * | 5/2005 | Hallak-Stamler ........... 709/223 |

FOREIGN PATENT DOCUMENTS

WO    WO 03/067853    8/2003

* cited by examiner

Primary Examiner—Scott Baderman
Assistant Examiner—Loan Truong
(74) Attorney, Agent, or Firm—Maginot, Moore & Beck

(57) ABSTRACT

A diagnostic method for diagnosing post-manufacture modular add-on components coupled to a system at least includes: a) dynamically retrieving control system topology information not stored at the time of manufacture pertaining to a module chosen for a system graphical display; b) via each module, generating diagnostic information about the components of a module; c) dynamically retrieving module diagnostic information pertaining to a module chosen for a system graphical display; d) hierarchically displaying the component levels of the module chosen for graphical display; e) providing a link between the component levels; and f) indicating the diagnostic status of a displayed component level.

6 Claims, 4 Drawing Sheets

DYNAMIC CONTROL SYSTEM DIAGNOSTICS FOR MODULAR ARCHITECTURES

FIELD OF THE INVENTION

The present invention generally relates to the automated diagnostics of electrical, mechanical and electromechanical systems and devices. More specifically, the present invention relates to improved diagnostics and troubleshooting for systems and devices which accommodate modular add-ons.

BACKGROUND OF RELATED ART

Current electrical and electromechanical systems such as document reproduction machines are increasingly manufactured and sold as separate modular components which can be attached and assembled at the eventual operational site. There is also a desire to provide effective diagnostic programs that electronically monitor the status of the modular components and report any fault conditions (conditions which are outside of expected normal operation) to a convenient display to enhance the ability of both service repair persons and customers to properly diagnose the causes of, and solutions for component malfunctions.

Prior art approaches to modular system diagnostics are typified by the Xerox 5090/family of products, where the electrical control information for all of the modular components anticipated to be connected in the system are pre-stored prior to the core component or components leaving the factory. A hierarchical display illustrates the electrical control topology of each of the modules coupled to the system that can be used as an aid to indicate fault conditions in any of the components of a module. This is essentially a closed architecture approach to document reproduction systems, in that either only predefined modular components are to be attached to the system, or when other modular components are connected to the system (e.g., manufactured or supplied by separate entities that are unrelated to the manufacturer or supplier of the core system components), there is no possibility of either running diagnostics or displaying diagnostic results without modifying the standard user interface.

There is a need to provide a modular system with both an open architecture, and the ability to provide a dynamic electrical control diagrams incorporating the electrical control topology of all of the modules coupled to the system without relying upon pre-stored static or hard coded information. There is also a need to provide such an open architecture system for not only providing display information related to failure of components in the modules, but also modular component status information.

SUMMARY

In view of the above-identified problems and limitations of the prior art, the present invention provides a diagnostic method for performing diagnostics in a system adapted to receive modular components, the method at least including: a) graphically displaying a hierarchical representation of system components and modular add-on components; b) detecting the modular components coupled to the system; c) dynamically requesting and receiving the electrical control topology and fault status of each coupled modular component; and d) dynamically integrating the electrical control topology and fault status of each coupled modular component into the display of a).

The present invention also provides a diagnostic method for diagnosing post-manufacture modular add-on components coupled to a system, the method at least including: a) dynamically retrieving control system topology information not stored at the time of manufacture pertaining to a module chosen for a system graphical display; b) via each module, generating diagnostic information about the components of a module; c) dynamically retrieving module diagnostic information pertaining to a module chosen for a system graphical display; d) hierarchically displaying the component levels of the module chosen for graphical display; e) providing a link between the component levels; and f) indicating the diagnostic status of a displayed component level.

The teachings of the present invention can be applied to any number of electrical and electromechanical systems and machines, such as high speed, higher capacity photocopiers and printers, for example.

BRIEF DESCRIPTION OF THE DRAWINGS

Features of the present invention will become apparent to those skilled in the art from the following description with reference to the drawings, in which.

DETAILED DESCRIPTION

Figure 1:
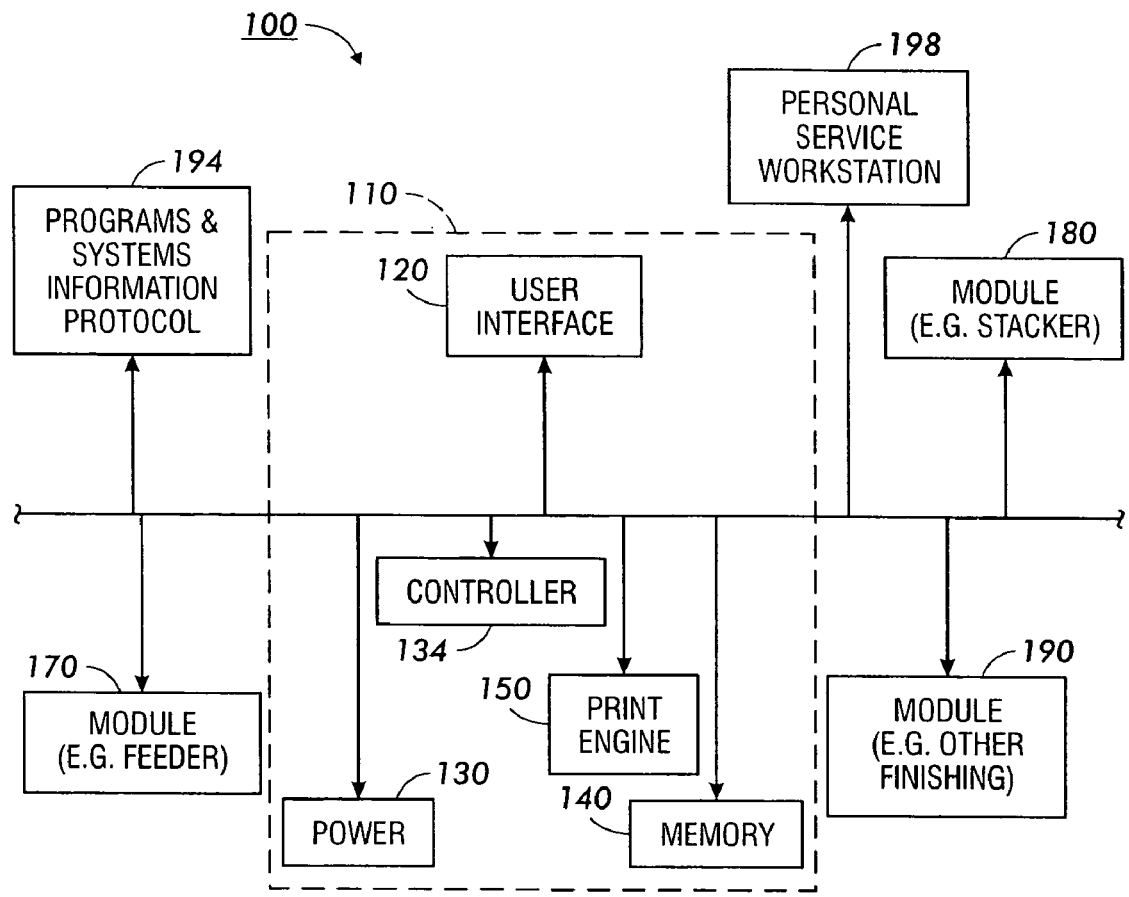
FIG. 1 is a general schematic diagram of the present-inventive system capable of automated, interactive diagnostics of add-on modular components.

The system 100 in FIG. 1 is a modular document reproduction system with an open architecture capability. The system core 110 can contain, for example, components such as a print engine 150 for performing electrostatic image reproduction, a power supply 130, a control unit 134, memory 140, and a user interface 120, serving both to communicate with a user and graphically and textually display status and diagnostic information about the components coupled to the system. Many module types are envisioned, including for example, a feeder module 170 for feeding documents to the main unit comprising the print engine, a stacker module 180 for staking and sorting document copies, and other modules such as the one 190 symbolically shown for other document finishing operations (e.g., binding). The modules can be connected via standard or proprietary buses without departing from the scope of the present invention.

Coupled to the user interface 120 is a display (not shown) for displaying the electrical control topology of all of the connected modules, as well as well as the status of each module, and any fault conditions of module components. The terms "peripheral," "computer peripheral," and "peripheral device" refer, for example, to any apparatus that can interface with a computer, whether it be a conventional computer peripheral device such as a printer, or other devices such as appliances with computer interfaces. Diagnostic routines for each module can be initiated and controlled either by the user interface 120, or a Program and Systems Information Protocol (PSIP) 194 or a Personal Service Workstation (PSW) 198 connected to the system core 110.

Figure 2:
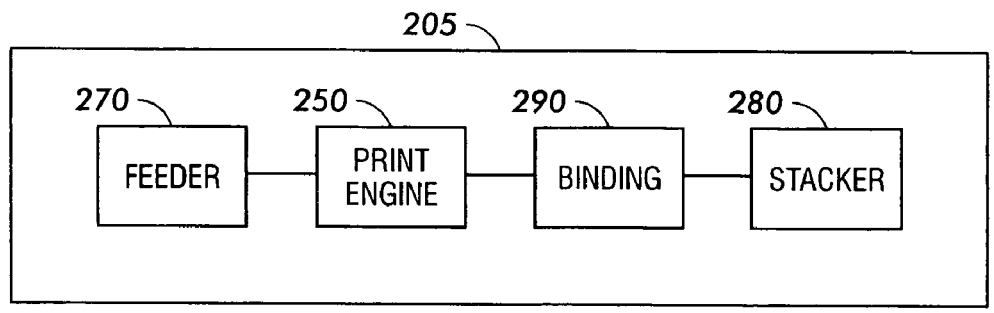
FIG. 2 is a sample graphical display of the modules connected to the system according to the present invention.

The display 205 in FIG. 2 graphically illustrates an example of what a system user might see showing the modules attached, along with their current status (e.g., functioning properly, malfunctioning, or indeterminate because of communication or power loss problems). For example, the graphical display 205 shows the feeder module 270 connected to the print engine 250, which is connected to a binding module 290 (for binding copies), which in turn is connected to a stacker module 280 for outputting (e.g., stacking and/or sorting) copies of a print job.

The present invention hierarchically displays the electrical control levels of each module connected to the system with the highest level displayed by default. Except for the highest level, each level has components that are electrically controlled by the level immediately higher than the level in question, and that same level electrically controls components in any lower immediate level.

Figure 3:
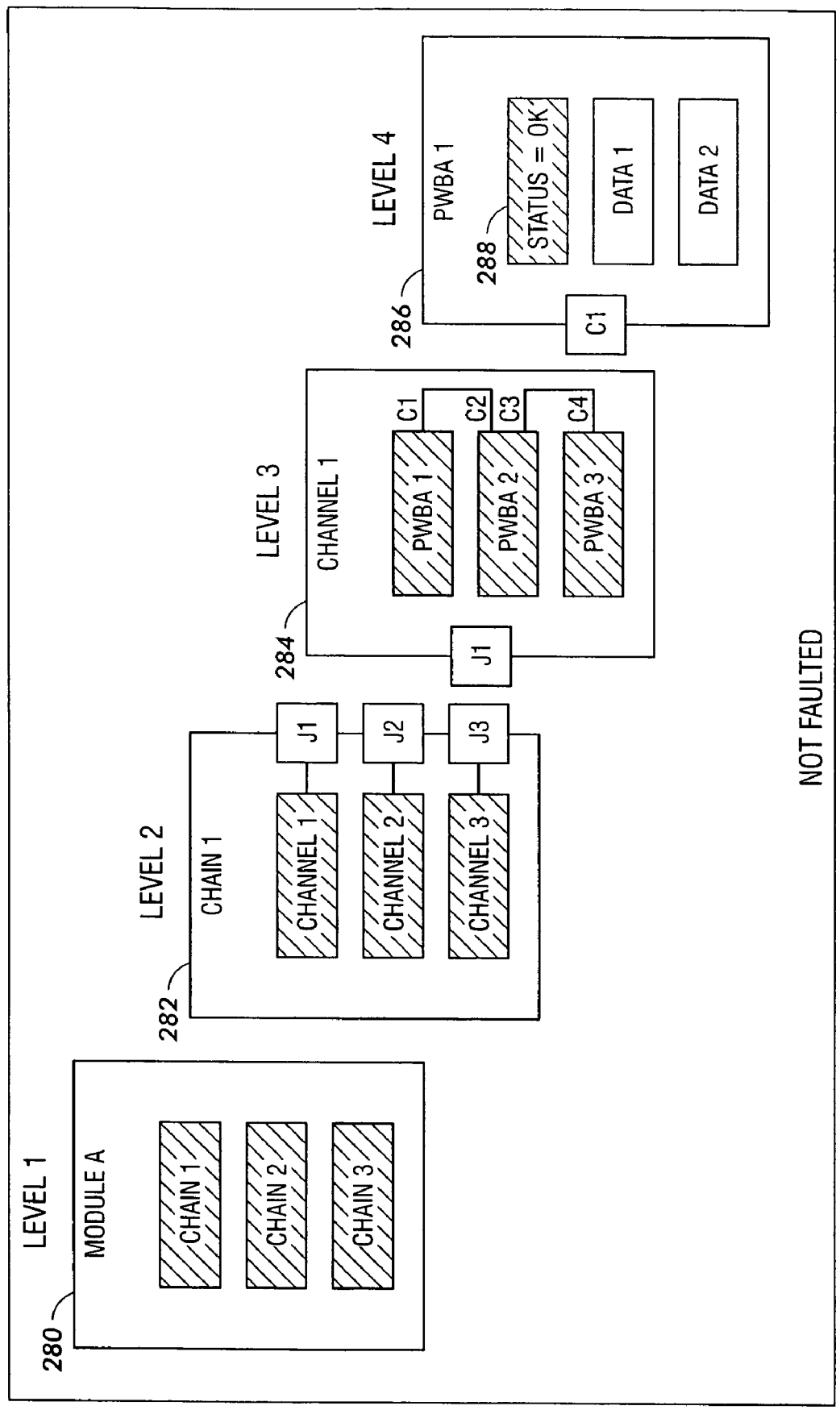
FIG. 3 shows the different levels of a hierarchical module representation where no components are in a fault condition.

A color-coding scheme is used in the preferred embodiment to indicate when modules experience a fault condition in any of their components. Thus, in FIG. 3 the first level representation 280 of the hierarchical display of the stacker module illustrates by the color (e.g., green) of its highest level that the stacker is functioning normally. The module 280 has three separate "chains" in the representation, representing three separate portions of the module. In the second level 282, each chain has multiple "channels," further representing refinements. In the third level 284 of the representation, each channel has multiple printed wiring board assemblies (PWBAs) representing individual elements. The fourth level 286 of the representation is that of a more detailed view of a PWBA. In FIG. 3, the status box 288 of the example PWBA 286 shows that the PWBA is operating normally (Status—"OK").

Figure 5:
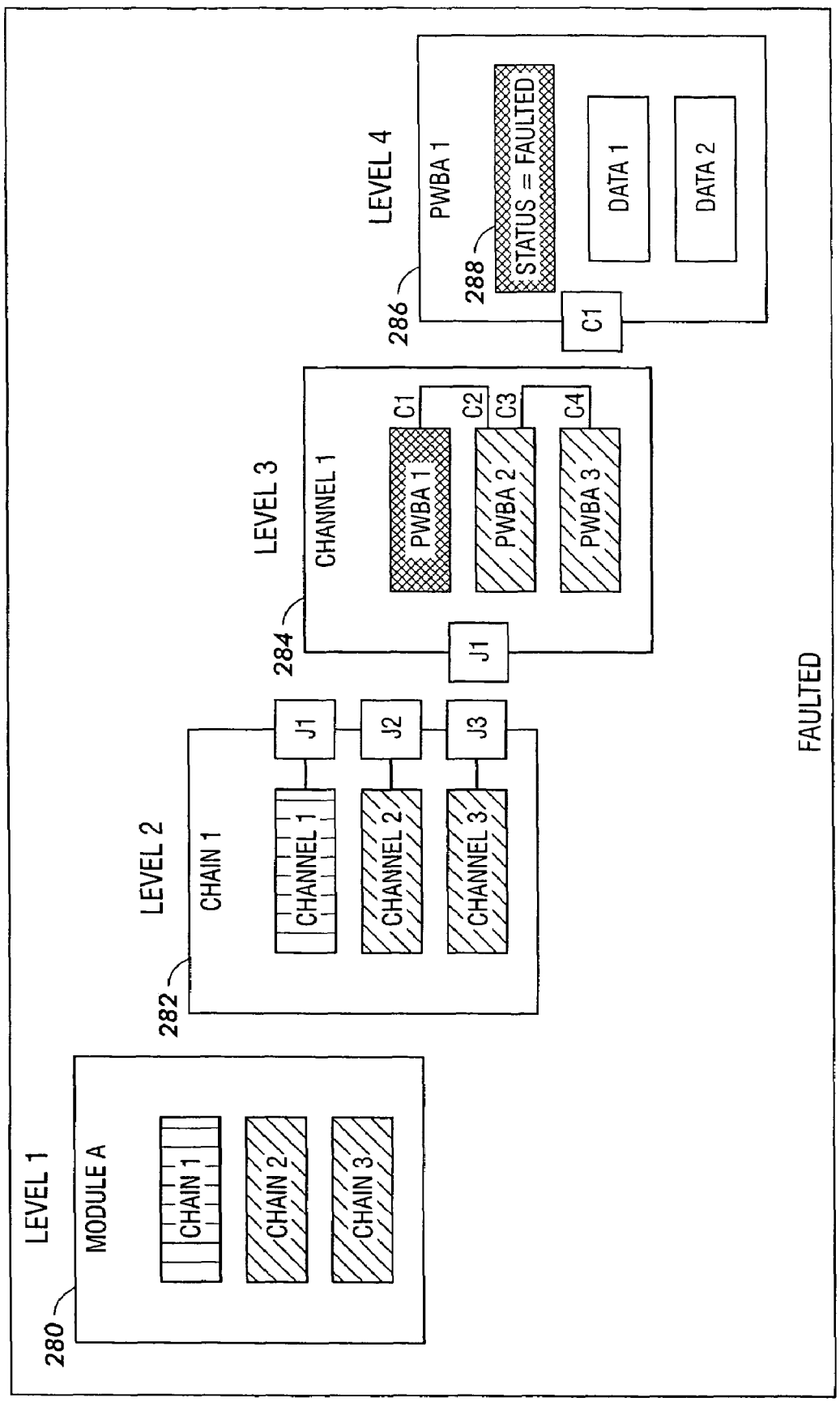
FIG. 5 shows the different levels of a hierarchical module representation where at least one component is in a fault condition.

In contrast to the example of a properly functioning module in FIG. 3, the representation in FIG. 5 shows a PWBA, and thus a module in a faulted condition. The color scheme of present invention indicates by a color such as yellow that there is a fault condition in Chain 1, and that there is further a fault condition in Channel 1. The color red, for example, indicates that PWBA 1 is faulted. Additionally, the color red is used to show in the fourth level 286 that the status (box 288) of PWBA 1 is faulted.

To summarize, when a module is shown to have a component in a fault condition, the user can "double click" on the highest level, and continue until he/she reaches the level indicated to have a malfunctioning component. That level will contain a display such as the one 286 in FIG. 5 showing the affected component or components, and the nature of the fault.

Those skilled in the art to which the present invention pertains will understand that the number of modules, chains, channels, PWBAs, etc., are a matter of design choice.

Figure 4:
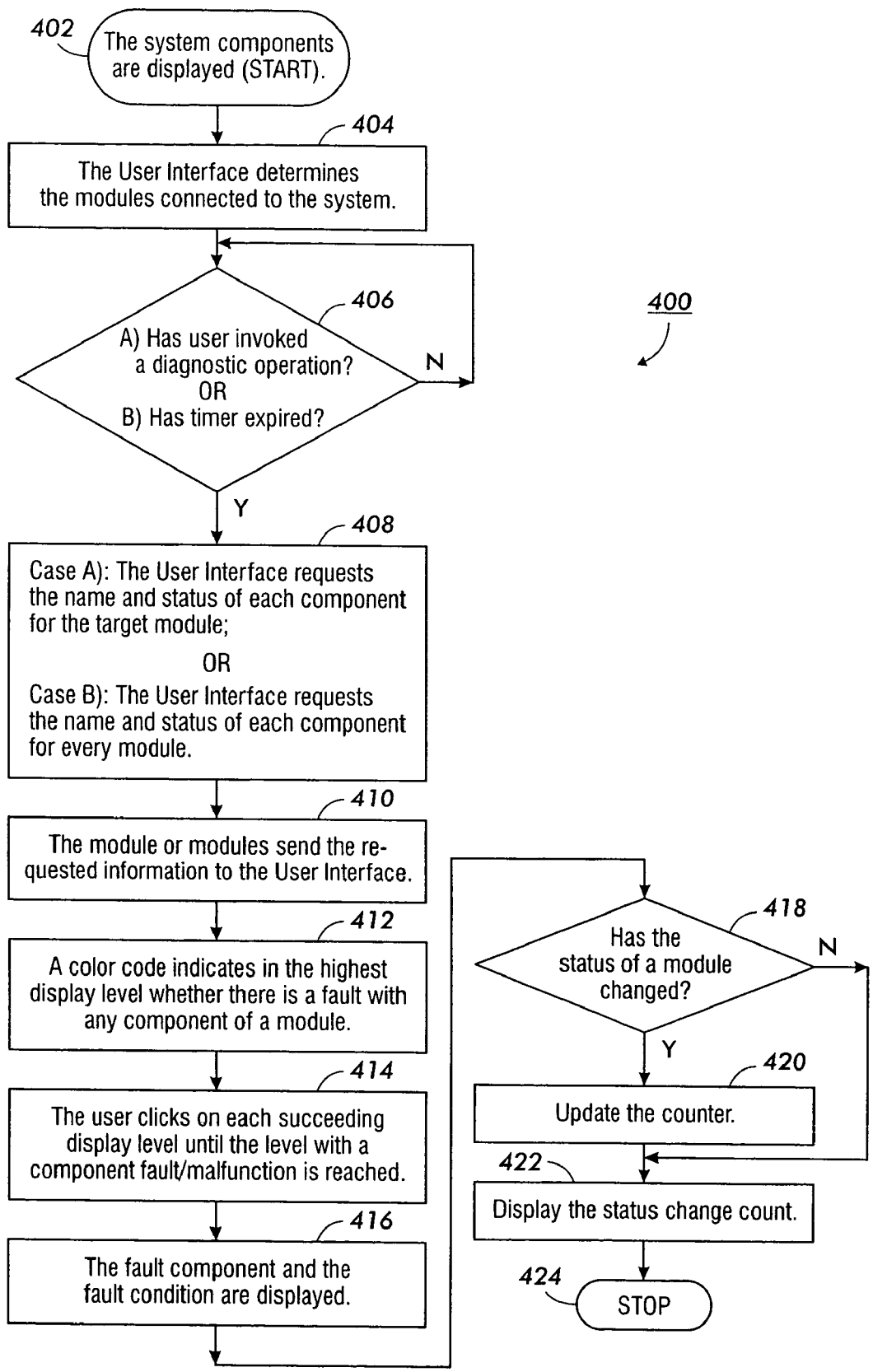
FIG. 4 is a flowchart detailing the steps employed by the present-inventive diagnostic and display method.

The automated diagnostic/troubleshooting program 400 of the present invention is illustrated in the flowchart of FIG. 4. While there are a number of possible starting points that are appropriate, give the teachings of the present invention, one possible starting step 402 graphically displays icons of the system modular components. In case new modules have been connected since the last diagnostic program, the user interface ascertains the modules that are connected to the system and updates the display (Step 404).

Global diagnostic operations are periodically run by the system in the preferred embodiment at the expiration of a timer (or alternatively, when a counter reaches a predefined count). Alternatively, the user can invoke a diagnostic operation for a particular module to be carried out between print jobs. Hence, Step 406 determines whether the user has invoked a diagnostic operation, or alternatively whether it is time for a scheduled periodic diagnostic operation. If either condition exists, the algorithm advances to Step 408. Otherwise, the algorithm remains at Step 406.

In Step 408 the user interface requests the name and status of each component of the targeted module for the case where the user has invoked a diagnostic operation for a particular module (Case A in FIG. 4). For the case where a global diagnostic operation is automatically run (Case B in FIG. 4), the user interface requests the name and status of each component for every module connected to the system. The polled module or modules respond to the user interface by transmitting the requested information in Step 410.

In Step 412, any fault conditions in a module are indicated by a special color code of the highest level in the graphical display. For example, if the icon of module is display in red as opposed to blue or green, a fault condition exists in one of the module's components. To determine where the fault condition exists in the module, the user "double-clicks" a pointing device to access succeeding levels of the module until the electrical level with the faulted component is reached (Step 414). The specific fault component and fault conditions are displayed in Step 416 (See also FIG. 3).

As was previously mentioned, a count of faults in a module and of specific modular components is also kept and displayed. Therefore, the algorithm determines if the status of a faulted component has changed since the last operation (Step 418). If so, the count is updated and displayed (Steps 420 and 422). If not, the existing count is displayed (Step 422). The algorithm ends at Step 424.

It should be recalled that the functions in the diagnostic and display algorithm 400 carried out by the user interface can be carried out by other means such as a PSIP or PSW (see supra).

Thus has been described an open architecture modular system capable of running diagnostics on all of the connected modules and graphically displaying the status and specific fault conditions of modular components through a standard interface, without the limitations of hard-coded prior art approaches (which predefine the specific modules for which diagnostics can be run and graphically displayed).

Variations and modifications of the present invention are possible, given the above description. However, all variations and modifications which are obvious to those skilled in the art to which the present invention pertains are considered to be within the scope of the protection granted by this Letters Patent.

What is claimed is:

1. A diagnostic method for performing diagnostics in a modular document reproduction system adapted to receive modular components comprising:

graphically displaying a hierarchical representation of a modular document reproduction system, the graphical display of the hierarchical representation including system components and modules of the modular document reproduction system;

detecting all of the modules coupled to the modular document reproduction system;

updating the graphical display of the hierarchical representation of the modular document reproduction system to include detected modules;

sending a request for status to a module presented in the updated graphical display;

receiving electrical control topology and fault status for each component of the module identified in the request for status; and dynamically integrating the electrical control topology and fault status for each component of the module corresponding to the request into the graphical display of the hierarchical representation of the modular document reproduction system.

2. The method of claim 1, wherein a fault condition in a component of the module corresponding to the request for status is displayed in the highest hierarchical level pertaining to the module.

3. The method of claim 2, wherein a fault condition in a component of a module is indicated by color-coded indicia in the highest hierarchical level pertaining to the module, and the color-coded indicia in the highest hierarchical level is different than color-coded indicia used in a lower hierarchical level to indicate the fault condition in the component.

4. The method of claim 1, wherein a lower level component of the module corresponding to the request for status is displayed by activating a pointer on the immediately higher level component.

5. The method of claim 1, further comprising:

maintaining a count of each time the fault status of a component in a module changes; and displaying said count in the graphical display of the hierarchical representation of the modular document reproduction system.

6. The method of claim 5, further comprising:

sending a request for status to a module presented in the undated graphical display of the hierarchical representation of the modular document reproduction system at predefined intervals.

* * * * *